Dec. 16, 1930.  A. L. DUNCAN  1,785,006
FRUIT PITTING AND CORING METHOD
Filed Nov. 22, 1926

Inventor
Arthur L. Duncan
William A. Strauch
By
Attorney

Patented Dec. 16, 1930

1,785,006

UNITED STATES PATENT OFFICE

ARTHUR L. DUNCAN, OF PIEDMONT, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT PITTING AND CORING METHOD

Application filed November 22, 1926. Serial No. 150,082.

The present invention relates to improvements in fruit pitting, and coring methods and apparatus, and more particularly the invention relates to improvements in the methods and apparatus for coring and pitting fruits disclosed in my copending applications Serial No. 756,175 filed December 16, 1925, and Serial No. 94,025 filed March 11, 1926. In the methods and apparatus of my copending applications, a cleft, groove or channel is formed in the flesh of a single stone fruit substantially in the plane of the suture of the pit, and severing means are entered into the cleft or channel formed in this manner adjusted to remove a core corresponding in diameter approximately to the diameter of the pit in the plane of its suture. The knives are then rotated in a substantially circular path about the longitudinal axis of the pit severing a core from the fruit that is substantially circular in transverse cross-section. In certain varieties of peaches, the curvature of the pit sides is relatively flattened so that when cores circular in cross-section and comprising the substantially intact pit are removed from such fruits, a section of desirable fruit pulp is removed with the core.

A primary object of the present invention is to provide improvements in methods and apparatus of the character mentioned whereby the shape of the core removed may be varied in accordance with the shape of the pit to be removed to reduce waste of desirable fruit pulp when the pit sides are relatively flat.

A further object of the invention is to provide novel methods and apparatus for adjusting pitting means to the suture of single stone fruit pits, and for causing the pitting means to follow paths following a predetermined path approximating the general curvature of the pit sides but independently of the pit to remove a core comprising the intact pit.

Further objects of the invention are such as will hereafter appear from a detailed description of the preferred embodiment of the invention and are such as are defined by the scope of the appended claim.

Figures 1, 2, 3:
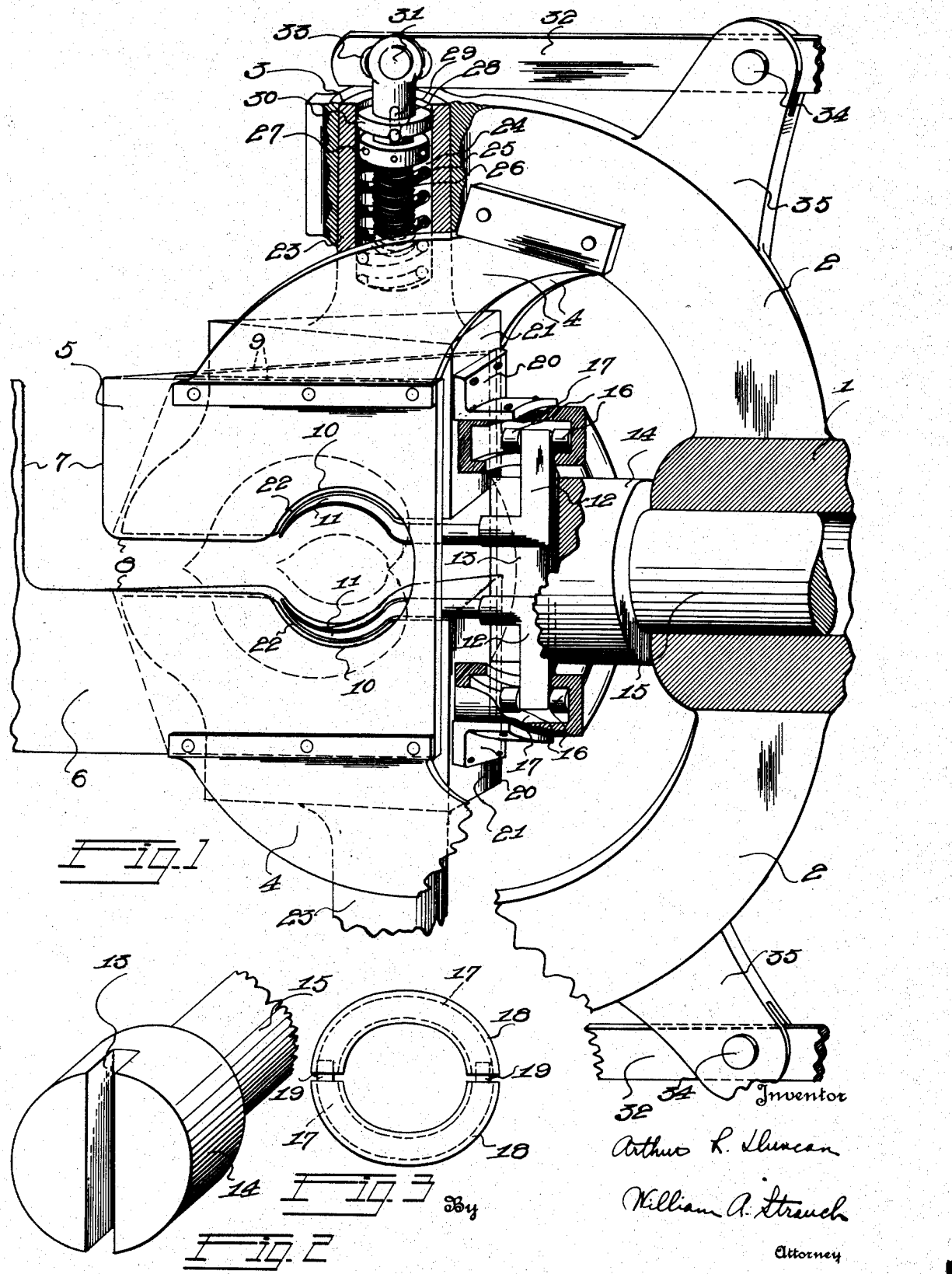
Figure 1 is a perspective side elevation partially in section, with parts broken away, showing the essential parts of my improvement.
Figure 2 is a fragmental perspective view showing the knife driving shaft head.
Figure 3 is a fragmental view showing the construction of the knife guiding cams.

The mechanism comprises in general a stationary supporting framework 1 provided with the supporting arms 2 which have formed in their outer ends the circular bores 3. Secured to the arms 2 adjacent the bores 3 are the upper ends of brackets 4 which extend outward and downward having secured at their lower ends the cleaving and impaling blade structures 5 and 6. The blades 5 and 6 are spaced apart and provided with the wedge shaped cutting edges 7 and 8 which form a path between them to permit the passage of the pit of a fruit in the plane of its suture and serve to substantially expose the central core embodying the pit to be removed in the plane of the suture of the pit. The blades 5 and 6 are formed integrally with the wedging extensions 9 which wedge the fruit halves apart to widen the groove or channel and guide the fruit to the proper position to have the pit removed therefrom. Formed in the wings 9 are recesses 10 through which the curved pitting knives 11 are adapted to rotate to enter the flesh of the fruit. Pitting knives 11 are shaped to conform approximately to the curvature of and to substantially encompass the pit to be removed in he plane of its suture and are secured in knife holders 12. Knife holders 12 are slidably mounted in slots 13 formed in the knife holder driving head 14 of the rotatable shaft 15 and secured to the outer ends of the knife holders 12 are the cam rollers 16. Cam rollers 16 are mounted in the cam grooves 17 of the relatively movable cam section 18. One of the cam sections 18 is provided with guide extensions 19 which fit into suitable guide recesses formed in the metal of the other cam section 18 to guide relative movement of the cam sections toward and away from each other as will more fully hereinafter appear. Cams 18 are removably secured by means of the brackets 20 to the wedge-shaped jaws 21. Jaws 21 are slidably mounted between and guided by wings 9 of the knives 5 and 6 and are recessed at 22 to receive the curved pitting knives 11 in their normal position of rest. Jaws 21 are provided with cylindrical extensions 23 which are slidably mounted in bores 3 of arms 2. Formed in each of the extensions 23 is a recess or bore 24 in which the helical springs 25 are disposed. Helical springs 25 surround threaded ends of actuating plungers 26 and are disposed between the bottoms of the bores 24 and the collars 27 threaded on plungers 26. Disposed in the outer ends of the bores 24 and held in position by the securing pins 28 which also extend through guide slots 29 of plungers 26 are stop collars 30. The outer ends of plungers 26 are bifurcated and connected by securing pins 31 to the forward ends of the actuating arms 32. Pins 31 extend through slots 33 of the actuating arms 32, and these arms are pivotally connected by means of pins 34 to extensions 35 of arms 2.

Shaft 15 is suitably journaled in support 1 and this shaft together with the actuating arms 32 are operated by any suitable mechanism to first oscillate the arms 32 about their pivots 34 to close the jaws 21, and the pitting knives 11 about the pit of the fruit, and to thereafter rotate the knives through approximately 180° to sever a central core from the fruit. For example, the hand operating mechanism for the knife operating shaft and the jaw operating arms shown in my copending application Serial No. 94,025 is particularly adapted for the operation of the knife shaft 15 and the jaw operating arms 32 in a manner obvious to one skilled in the art. As these details form no part of my present improvement, further details are not here given, and a reference to my copending application may be had for a full disclosure thereof.

In operation of the device, the fruit to be pitted or cored, for example a peach, is forced downward between the edges 7 of the blades 5 and 6 with the blades substantially in the plane of the suture of the fruit pit, and the longitudinal axis of the pit substantially perpendicular to the edges 7. This forms vertical clefts or grooves in the fruit flesh in the plane of the suture. After passing the edges 7 the fruit is then forced to the right (Figure 1) between the cutting edges 8 on to the wedging wings 9 to the position indicated by the dotted outline of the peach shown. An annular groove, channel or cleft will have been formed in the pulp of the fruit, and the pit of the fruit will be positioned between the curved sections of the knives 11. The mechanism is then operated causing the arms 32 to force plungers 26 inward compressing springs 25 and forcing jaws 21, cams 18, knife holders 17, and the knives 11 yieldingly together until the knives 11 embrace the pit of the fruit in the plane of its suture. When the knives and jaws have been closed about the pit of the fruit, shaft 15 is rotated to 180°, and rotates the knives 11 outward through recesses 10 of the wings 9 and through the flesh. The path of the knives 11 through the fruit pulp is guided by cam rollers 16 which travel in the cam grooves 17 of cam sections 18. Cam grooves 17 are shaped so that the path of the knives will conform generally to the curvature of the pit sides. When pitting varieties of peaches in which a cross-section through the pit is substantially circular the cam grooves 17 may be circular in shape, and when pitting varieties of peaches with relatively flat sides, cams with grooves that cause the knives to depart from the circular path and to follow generally a path that conforms to the flat pit sides may be provided, removing a more or less oval core comprising the substantially intact pit and eliminating waste of fruit pulp in this type of peaches.

It will be apparent to those skilled in the art that novel methods and apparatus for pitting fruits has been described, the details of which may be varied without departing from the spirit of my invention. For example, instead of depending entirely upon a wedging action to form the cleft or groove in the fruit for the entry of the pitting knives, slice removing and tip trimming knives may be utilized as shown in my copending application Serial No. 94,025. Accordingly, what is desired to be secured by Letters Patent and claimed as new is:

The method of cutting a substantially whole pit from a peach having the edges of the pit in the plane of its suture exposed, which comprises adjusting the severing means substantially to the outline of the exposed pit edges and then moving said severing means transversely of such edges on a non-circular path unguided by the body of the pit.

In testimony whereof I affix my signature.

ARTHUR L. DUNCAN.